(12) United States Patent
Philippart

(10) Patent No.: US 9,281,084 B2
(45) Date of Patent: Mar. 8, 2016

(54) MOTOR STAND OF A PRIMARY MOTOR-DRIVEN PUMP UNIT OF A PRESSURIZED WATER NUCLEAR REACTOR

(75) Inventor: Olivier Philippart, Valenciennes (FR)

(73) Assignee: AREVA NP, Courbevoie (FR)

( * ) Notice: Subject to any disclaimer, the term of this patent is extended or adjusted under 35 U.S.C. 154(b) by 903 days.

(21) Appl. No.: 12/957,758

(22) Filed: Dec. 1, 2010

(65) Prior Publication Data
US 2011/0135511 A1    Jun. 9, 2011

(30) Foreign Application Priority Data

Dec. 8, 2009 (FR) .................................... 09 58743

(51) Int. Cl.
| | |
|---|---|
| *G21C 13/024* | (2006.01) |
| *G21C 5/10* | (2006.01) |
| *F04D 29/62* | (2006.01) |
| *G21C 15/24* | (2006.01) |
| G21C 13/02 | (2006.01) |
| G21C 9/04 | (2006.01) |
| G21C 13/00 | (2006.01) |

(52) U.S. Cl.
CPC ............ *G21C 13/024* (2013.01); *F04D 29/628* (2013.01); *G21C 5/10* (2013.01); *G21C 15/24* (2013.01); *G21C 9/04* (2013.01); *G21C 13/00* (2013.01); *G21C 13/02* (2013.01); *Y02E 30/32* (2013.01)

(58) Field of Classification Search
CPC ............................ F04D 29/628; G21C 13/024
USPC ........... 417/360; 403/335, 336, 337; 248/151, 248/154, 200.1, 201, 218.4, 219.1, 357, 248/499, 555, 658, 659, 672, 675
See application file for complete search history.

(56) References Cited

U.S. PATENT DOCUMENTS

| | | | | | |
|---|---|---|---|---|---|
| 570,975 | A | * | 11/1896 | Anderson | ...................... 285/412 |
| 943,461 | A | * | 12/1909 | Reynolds | ...................... 285/412 |
| 986,506 | A | * | 3/1911 | Sargent | ...................... 219/137 R |
| 992,022 | A | * | 5/1911 | Matthews | ....................... 285/18 |
| 1,163,967 | A | * | 12/1915 | Arntzen et al. | ............... 464/104 |

(Continued)

FOREIGN PATENT DOCUMENTS

EP             0403049 A2 * 12/1990 ............ F04D 29/628

OTHER PUBLICATIONS

Merriam-Webster.com, Definition of Boss—Merriam-Webster Online Dictionary, Jun. 23, 2007, p. 1.*

*Primary Examiner* — Joshua J Michener
*Assistant Examiner* — Chiedu Chibogu
(74) *Attorney, Agent, or Firm* — Pearl Cohen Zedek Latzer Baratz LLP

(57) ABSTRACT

A motor stand of a primary motor-driven pump unit of a pressurized water nuclear reactor comprises an upper flange and fixing means suited to ensure the fixing of transverse holding means of the said primary motor-driven pump unit, the said primary motor-driven pump unit comprising an electric motor having a lower flange suited to be integrated with the said upper flange of the said motor stand. The motor stand is characterized in that the said fixing means comprise an annular element resting on the said upper flange of the said motor stand suited to be flanged between the said upper flange of the said motor stand and the said lower flange of the said motor, the said fixing means comprising at least one radial excrescence in which there is arranged a space suited to receive the said holding means.

11 Claims, 3 Drawing Sheets

(56) References Cited

U.S. PATENT DOCUMENTS

| | | | | |
|---|---|---|---|---|
| 1,525,647 A * | 2/1925 | Haughey | | 285/412 |
| 2,565,606 A * | 8/1951 | Guy | | 464/72 |
| 2,587,345 A * | 2/1952 | Lombard | | 248/555 |
| 2,753,140 A * | 7/1956 | Hasbrouck et al. | | 248/555 |
| 3,165,341 A * | 1/1965 | Burns et al. | | 285/406 |
| 3,270,906 A * | 9/1966 | Christensen | | 220/582 |
| 3,400,952 A * | 9/1968 | Swenson et al. | | 285/114 |
| 3,537,729 A * | 11/1970 | Burkett | | 285/55 |
| 3,788,580 A * | 1/1974 | Schneider | B01J 9/0053 | 248/674 |
| 4,149,934 A * | 4/1979 | Jacobs et al. | | 376/249 |
| 4,230,527 A * | 10/1980 | Cella | | 376/402 |
| 4,847,038 A * | 7/1989 | Martin | | 376/260 |
| 5,017,104 A * | 5/1991 | Baker | F04D 29/044 | 384/252 |
| 5,226,288 A * | 7/1993 | Cornax | | 60/226.1 |
| 5,307,386 A * | 4/1994 | Chavez et al. | | 376/260 |
| 5,379,331 A * | 1/1995 | Brouttelande | | 376/285 |
| 5,401,062 A * | 3/1995 | Vowles | | 285/12 |
| 5,437,482 A * | 8/1995 | Curtis | F16L 23/028 | 285/148.13 |
| 5,472,214 A * | 12/1995 | Wainer et al. | | 277/609 |
| 5,651,629 A * | 7/1997 | Wall et al. | | 403/2 |
| 6,050,614 A * | 4/2000 | Kirkpatrick | F16L 23/0283 | 123/469 |
| 6,581,941 B2 * | 6/2003 | Carr | | 277/609 |
| 6,869,081 B1 * | 3/2005 | Jenco | | 277/611 |
| 6,948,717 B1 * | 9/2005 | Carr | | 277/609 |
| 7,798,788 B2 * | 9/2010 | Varennes | F04D 19/042 | 285/368 |
| 8,599,989 B2 * | 12/2013 | Kang | G21C 7/14 | 376/260 |
| 8,701,258 B2 * | 4/2014 | Koepke | | 29/402.14 |
| 2003/0234541 A1 * | 12/2003 | Thompson | F16L 23/0283 | 285/412 |
| 2007/0189434 A1 * | 8/2007 | Jensen | | 376/260 |

* cited by examiner

MOTOR STAND OF A PRIMARY MOTOR-DRIVEN PUMP UNIT OF A PRESSURIZED WATER NUCLEAR REACTOR

CROSS REFERENCE TO RELATED APPLICATIONS

This application claims priority of French Patent Application No. 09/58743, filed Dec. 8, 2009, which is incorporated by reference herein.

FIELD OF INVENTION

The present invention concerns a motor stand of a primary motor-driven pump unit of a pressurized water nuclear reactor.

The field of the invention is that of pressurized water nuclear reactors. The invention concerns, more particularly, a primary motor-driven pump unit (also called "reactor coolant pump set") of the primary circuit of a pressurized water nuclear reactor and more particularly a motor stand of such a unit.

BACKGROUND OF INVENTION

In a known manner, pressurized water reactors comprise a reactor vessel filled with water under pressure in which the core of the reactor is contained, and also a primary circuit formed of several loops in communication with the reactor vessel. The primary circuit of a pressurized water reactor comprises, in a conventional manner, 3 or 4 loops connected in a symmetrical manner to the vessel of the reactor. FIG. 1 shows typically a loop of the primary circuit of a pressurized water reactor. Each loop of the primary circuit comprises:
- a steam generator 1 in which the water under pressure cools, heating and vaporizing secondary feed water;
- a primary pump 2, designated primary motor-driven pump or primary motor-driven pump unit (GMPP), ensuring the circulation of the water under pressure in the primary circuit.

The primary circuit also comprises a pressurizer (not shown) connected to one of the loops by an expansion line.

Each loop of the primary circuit is formed by primary ducts comprising:
- a hot branch 3 connecting the reactor vessel 6 to the steam generator 1,
- a branch 5 having a U-shape, designated the U-branch, connecting the steam generator 1 to the primary motor-driven pump unit 2,
- a cold branch 4 connecting the primary motor-driven pump 2 to the reactor vessel 6.

The cooling water of the reactor under pressure is circulated in each loop by the primary motor-driven pump unit 2. The heated water in the reactor vessel 6, in contact with the core, arrives in the lower zone 1a of the steam generator 1, forming a water box, by the hot branch. The water then circulates in the tubes of the steam generator 1 where it cools, heating and vaporizing the secondary feed water. The cooled water then returns in the water box to be sent back to the primary motor-driven pump unit 2 by the U-branch 5, then to the reactor vessel 6 by the cold branch 4. The direction of circulation of the water under pressure is shown by way of indication by the arrows in FIG. 1.

The primary motor-driven pump unit 2 is a machine having a vertical axis, comprising in its upper part 2a an asynchronous electric motor fixed above a pump of the helico-centrifugal type, situated in the lower part 2b of the primary motor-driven pump unit 2, the electric motor and the pump being integrated by means of an element designated the motor stand 7.

The primary motor-driven pump unit 2 rests on articulated supports 9, typically three in number, having a swivel at each of their ends. The articulated supports 9 are disposed so as to permit the displacement of the primary motor-driven pump unit 2 under the effect of the thermal expansions of the primary ducts during the functioning of the reactor.

In a known manner, the primary motor-driven pump unit 2 is also held transversely by transverse holding devices (not shown).

The transverse holding devices, and also the articulated supports, permit slow displacements of the primary motor-driven pump unit within limits of permitted travel, i.e. typically slow displacements resulting from the expansion of the primary ducts.

In the case of rapid and consecutive displacements due to accidental situations, such as for example an earthquake or else a rupture of primary ducts, the transverse holding devices ensure the holding of the primary motor-driven pump unit transversely.

The transverse holding devices are disposed radially about the primary motor-driven pump unit along two concurrent directions generally forming an angle close to 90° and are connected to fixing means of the motor stand of the primary motor-driven pump unit.

In the known designs, the motor stand is a large-sized part made of steel, produced by foundry work.

The fixing means of such a stand are generally located at a height close to the placement plane of the fixing flange of the motor stand on which the motor is secured.

The fixing means are formed by a stirrup-shaped yoke produced during the production of the motor stand by foundry work and cooperate with the transverse holding device comprising a connecting arm. The connection between the yoke of the motor stand and the connecting arm of the transverse holding device is ensured by a transverse axis passing through the yoke and the arm so as to form a pivot link.

However, the manufacture by foundry work of the motor stand integrating the fixing means in the form of a yoke poses production problems owing to the large thicknesses required with respect to the fixing yokes.

SUMMARY OF THE INVENTION

In this context, the invention aims to solve the above-mentioned problems and to propose a design for a motor stand allowing the production of such a motor stand of a primary motor-driven pump unit to be simplified.

To this end, the invention proposes a motor stand of a primary motor-driven pump unit of a pressurized water nuclear reactor comprising an upper flange and fixing means suited to ensure the fixing of transverse holding means of the said primary motor-driven pump unit, the said primary motor-driven pump unit comprising an electric motor having a lower flange suited to be integrated with the said upper flange of the said motor stand, the said motor stand being characterized in that the said fixing means comprise an annular element resting on the said upper flange of the said motor stand suited to be flanged between the said upper flange of the said motor stand and the said lower flange of the said motor, the said fixing means comprising at least one radial excrescence, in which there is arranged a space suited to receive the said holding means.

Owing to the invention, it is possible to propose a simplified design of the motor stand of a primary motor-driven pump unit of a pressurized water nuclear reactor without fixing means in the form of a yoke, large thicknesses, thus allowing the production constraints of the motor stand to be overcome.

To this effect, the motor stand according to the invention comprises an annular flanging element, suited to be inserted and flanged between the annular flange of the motor stand and the annular flange of the motor. The annular element comprises a radial excrescence in which a space is arranged, allowing a connection to be ensured with the connecting arm of the transverse holding means, in particular by means of a transverse axis passing through the radial excrescence and the connecting arm.

The architecture of a pressurized water reactor installation dictates appreciably the positioning of the different primary motor-driven pump units as a function of the availability to the ground for the location of the articulated supports; it is therefore frequent that the angular localization of the fixing means is different from one motor stand to another for the same installation, or for two different installations. According to the known designs of motor stand, it is therefore necessary to develop as many molding devices of motor stands as localization situations of the fixing means. Owing to the invention, the design of the motor stand is simplified and allows the production of a plurality of molding devices to be overcome. In fact, in so far as a certain revolution symmetry of the annular element exists, it is possible to modify the position of the annular element, and consequently the radial excrescence, as a function of the location of the primary motor-driven pump unit and as a function of the location of the articulated supports.

Thus, owing to the invention, it is possible to meet all the location situations of a primary motor-driven pump unit using standard parts.

The motor stand according to the invention can also have one or more of the characteristics below, considered individually or according to all the technically possible combinations:
- the said radial excrescence is formed by an appendage being manufactured with the said annular element and in the plane of the said annular element, the said fixing means comprising an upper plate and a lower plate arranged on either side of the said appendage so as to form the said space suited to receive the transverse holding means;
- the said appendage comprises a recessed zone bordered on either side by a projecting boss;
- the said upper plate and the said lower plate are each formed by an angle comprising two lateral branches and a central bore;
- the said transverse holding means are integral with the fixing means by a connecting axis passing through the central orifice of the said angles and the said transverse holding means;
- the said angles comprising bores passing through the said lateral branches suited to receive screwing means;
- at least one of the two angles comprises means for blocking in rotation the said screwing means;
- the said means for blocking in rotation the said screwing means are formed by grooves at the level of each of the lateral branches;
- at least one of the two angles is manufactured with the said annular element;
- the said annular element is rendered integral with the said support flange by screwing means;
- the said motor stand comprises a plurality of pins passing through the said annular element and the said support flange suited to block the rotation of the said annular element;
- the said support flange comprises a tenon and the said annular element comprises a complementary mortise, the said tenon and the said complementary mortise being suited to withstand the radial stresses transmitted by the said transverse holding means.

The invention also has as an object a primary motor-driven pump unit of a pressurized water nuclear reactor characterized in that it comprises articulated supports supporting the said primary motor-driven pump unit and a motor stand according to the invention, the position of the said fixing means of the said motor stand being able to be modified as a function of the location of the said articulated supports.

BRIEF DESCRIPTION OF THE DRAWINGS

Other characteristics and advantages of the invention will emerge more clearly from the description given below, by way of indication and being in no way restrictive, with reference to, the attached figures, in which.

In all the figures, the common elements have the same reference numbers, unless specified otherwise.

DETAILED DESCRIPTION OF THE INVENTION

Figure 1:
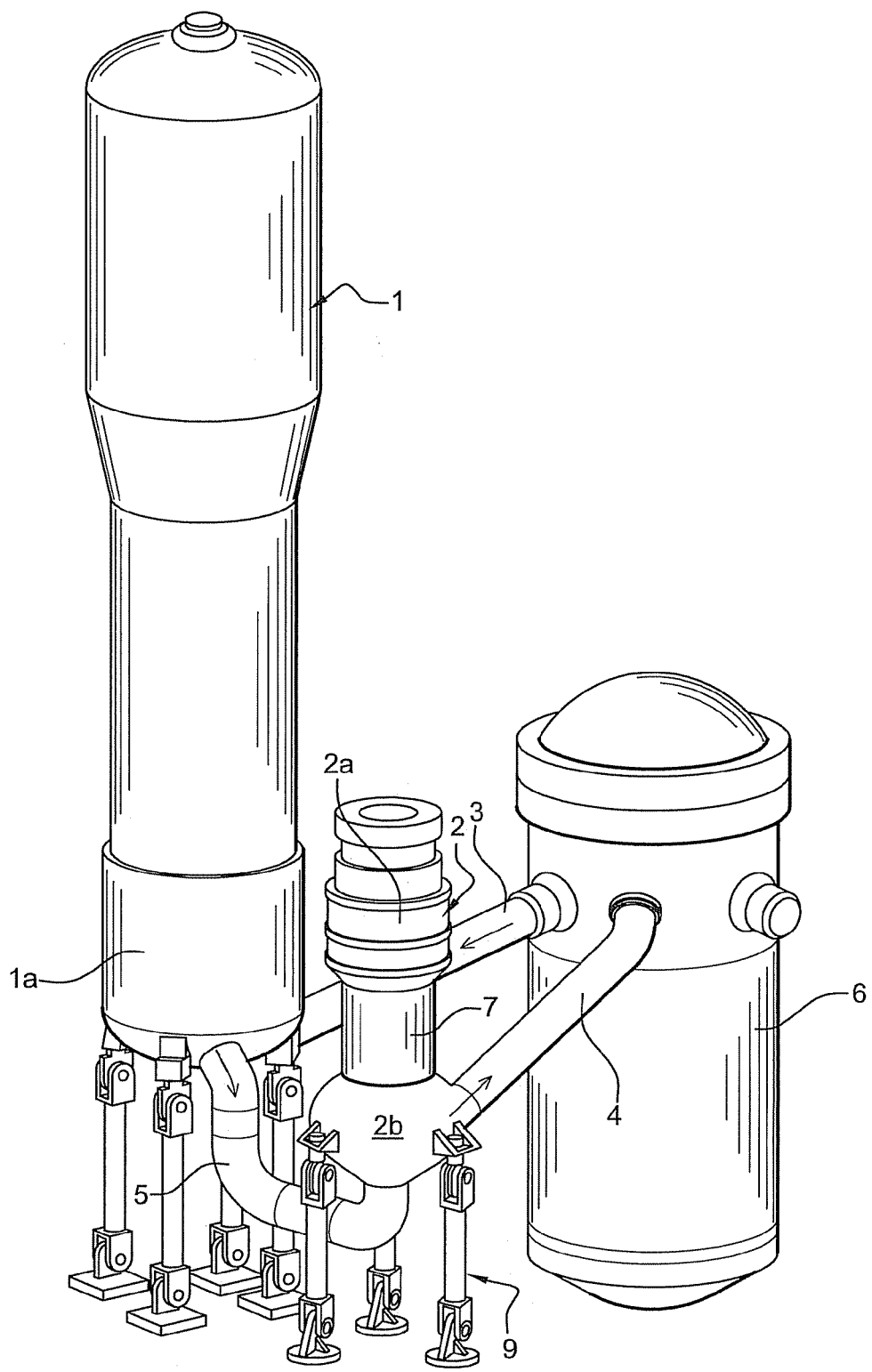
FIG. 1 illustrates a perspective view of a loop of a pressurized water nuclear reactor.

FIG. 1 has already been previously described with reference to the general presentation of the invention.

Figure 2:
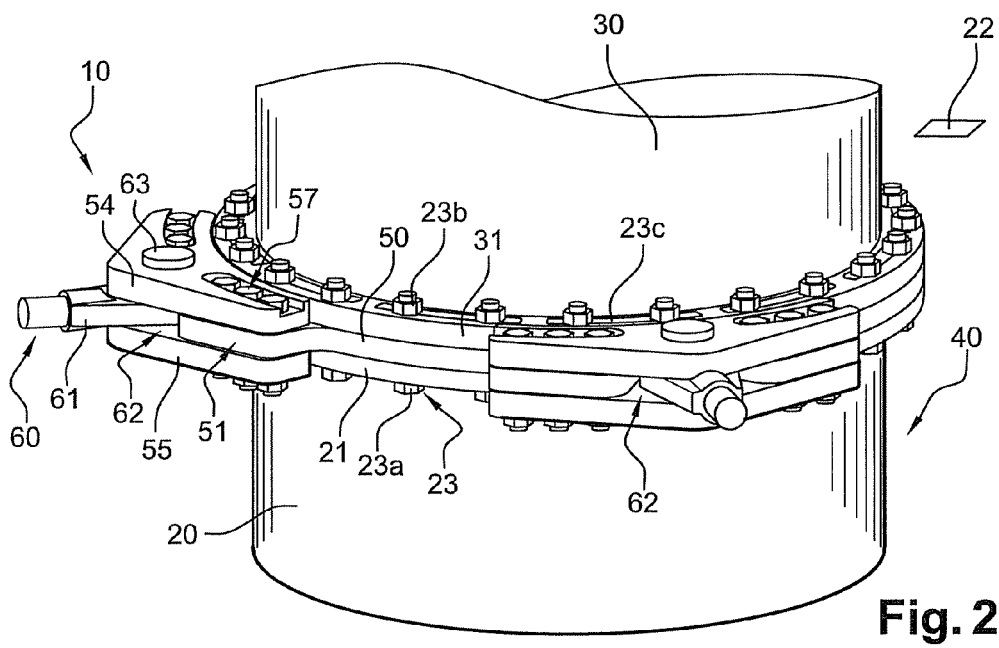
FIG. 2 illustrates a perspective view of the connection zone between a motor stand according to the invention and a motor of a primary motor-driven pump unit.

FIG. 2 illustrates a perspective view of the connection zone between a motor stand 20 according to the invention and a motor 30 of a primary motor-driven pump unit 40.

Figure 3:
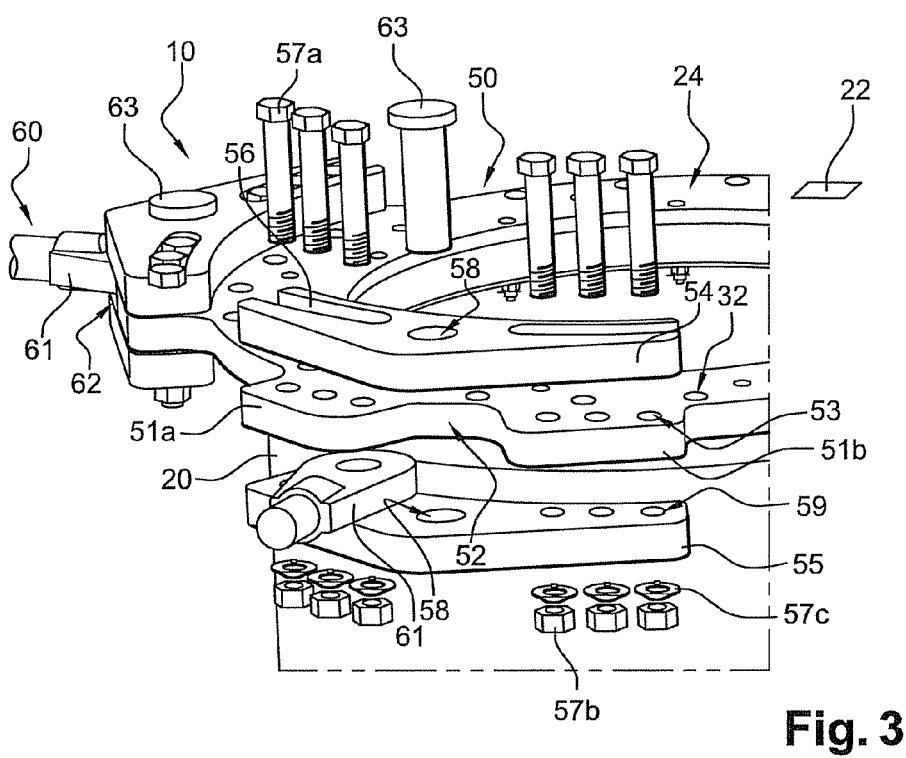
FIG. 3 illustrates an exploded partial view of the fixing means of the motor stand according to the invention illustrated in FIG. 2.

FIG. 3 illustrates a partial exploded view of the fixing means 10 of the motor stand 20 illustrated in FIG. 2.

The motor stand 20 is a substantially cylindrical part comprising at its upper end an annular flange 21, hereinafter designated "support flange", on which on its upper face an annular element 50 is integrated, such that the motor stand 20 presents a support plane 24, substantially parallel to a horizontal plane 22, suited to receive in support the motor 30. The motor 30 comprises to this effect an annular flange 31 in its lower part, hereinafter designated "motor flange", likewise presenting a support plane substantially parallel to the horizontal plane 22.

The support flange 21 and the motor flange 31 comprise a plurality of bores distributed radially on the periphery of the flanges 21, 31. The annular element 50 likewise comprises a plurality of bores 32, passing through it on either side, distributed such that the bores 32 are opposite the bores of the motor flange 31 and opposite the bores of the support flange 21.

The motor 30 is positioned on the motor stand 20 such that the bores of the motor flange 31 are positioned opposite the bores of the support flange 21 and the bores of the annular element 50.

The motor 30 and the motor stand 20 are flanged by means of a plurality of screwing means 23 formed typically by threaded screws with a hexagonal head 23a and nuts 23b.

Thus, the screwing means 23 pass through the flanges 21, 31 and the annular element 50 at the level of the bores 32. The arresting in rotation of these screwing means 23 is realized by resting of a face of the hexagonal head of the screws 23a against the motor stand 30 and blocking of the nuts 23b by means of lock-plates 23c.

The annular element 50 comprises at least one radial appendage 51 in the plane of the annular element 50, i.e. according to the support plane 24. According to the embodiment shown in FIGS. 2 and 3, the annular element 50 comprises two radial appendages 51 positioned according to two concurrent perpendicular radial directions forming an angle close to 90°. Each radial appendage 51 is formed by a first boss 51a, a second boss 51b and a recessed zone 52 positioned between the two bosses 51a, 51b forming a valley between the two bosses 51a and 51b.

At the level of each boss 51a, 51b, the appendage 51 comprises a plurality of bores 53 passing through it on either side.

The two bosses 51a, 51b are suited to receive respectively on their upper face and on their lower face a plate forming an upper angle 54 and a lower angle 55.

Thus, in other words, the annular element 50 comprises on the periphery at least one projecting excrescence, the excrescence being formed by a radial appendage 51 and by an upper angle 54 and a lower angle 55, arranged on either side of the appendage 51 so as to form a space 62 suited to receive transverse holding means 60.

The angles 54, 55 comprise two lateral branches arranged substantially in a V shape and having an opening angle not limited to a right angle.

The angles 54, 55 comprise, on each of the lateral branches, bores 59 disposed opposite the bores 53 of the bosses 51a, 51b.

The angles 54, 55 have a base of concave shape suited to conform in shape to the circular form of the flanges 31, 32, when the angles 54, 55 are assembled on the appendages 51.

On the external face of at least one of the angles 54, 55, i.e. on the face which is not in contact with the surface of the bosses 51a, 51b of the appendage 51 and at the level of the lateral branches having the bores 59, at least one groove 56 is arranged, suited for the insertion of screwing means 57, and in particular for the insertion and housing of the heads of screws 57a. According to the embodiment shown in FIGS. 2 and 3, only the upper angle 54 comprises grooves 56.

The screwing means 57 are formed by screws 57a with a hexagonal head, lock-plates 57c and nuts 57b.

According to the embodiment shown in FIGS. 2 and 3, the upper angles 54 comprise two grooves 56 situated on either side of a central bore 58 opening into a space 62 delimited by the recessed zone 52 of the annular element 50 and bordered by the angles 54, 55.

The depth of the grooves 56 corresponds substantially to the height of the heads of screws 57a and the width of the grooves 56 is substantially equal to, or slightly greater than, the dimension across flats of the hexagonal heads of the screws 57a, such that the heads of screws 57a can be inserted in the groove 56 and be held blocked in rotation by contact with at least one face of the screw head against the side of the groove 56.

Thus, the assembly of the set formed by the upper angle 54, the appendage 51 and the lower angle 55 is integrated by means of the plurality of screwing means 57 passing through the various elements of this set.

The system constituted by the angles 54, 55 and the annular element 50 thus form fixing means 10 suited to ensure the fixing of the transverse holding means of the primary motor-driven pump unit.

According to the advantageous embodiment shown, the primary motor-driven pump unit comprises two fixing means 10 suited to ensure the fixing of two transverse holding means. However, the primary motor-driven pump unit can comprise more than two fixing means 10 if it is necessary to hold the primary motor-driven pump unit transversely with more than two transverse holding means. The primary motor-driven pump unit can therefore comprise as many fixing means 10 as transverse holding means of the necessary primary motor-driven pump unit.

It will be recalled that the primary motor-driven pump unit is held on the one hand by articulated supports on which it rests, and transverse holding means.

Typically, the primary motor-driven pump unit rests on three articulated supports, having a swivel at each of their ends. The articulated supports are disposed so as to permit the displacement of the primary motor-driven pump unit under the effect of the thermal expansions of the primary ducts during the functioning of the reactor.

The transverse holding devices and the articulated supports permit a displacement of the primary motor-driven pump unit according to a permitted limit travel, i.e. typically slow displacements resulting from the expansion of the primary ducts.

In the case of rapid and consecutive displacements due to accidental situations, such as for example an earthquake or else a rupture of primary ducts, the transverse holding devices ensure the transverse holding of the primary motor-driven pump unit.

A first end of the connecting arm of the transverse holding means is represented in FIGS. 2 and 3 by reference number 60. The connecting arm of the transverse holding means comprises at its end a swivel 61 of equivalent or slightly smaller thickness than the thickness of the annular element 50.

The second end of the connecting arm of the transverse holding means (not shown) is fixed on the vertical walls of the fixed concrete structure inside which the primary motor-driven pump unit is positioned, this structure being commonly designated as a casemate.

The swivel 61 is inserted in the space 62 of the fixing means 10 formed by the recessed zone 52 of the appendage 51 and bordered by the angles 54, 55. The swivel 61 is held integral with the motor stand 20 by an axis 63 passing through the angles 54, 55 via the bore 58 and the swivel 61; the axis 63 thus ensures a pivot link between the motor stand 20 and the transverse holding means 60.

Thus, in accidental situations, such as a rupture of the primary ducts or else during an earthquake, the stresses at the level of the fixings of the transverse holding means 60 are exerted following radial directions. These stresses stress in shear the links formed by the upper angles 54, lower angles 55 and the annular element 50.

Figure 4:
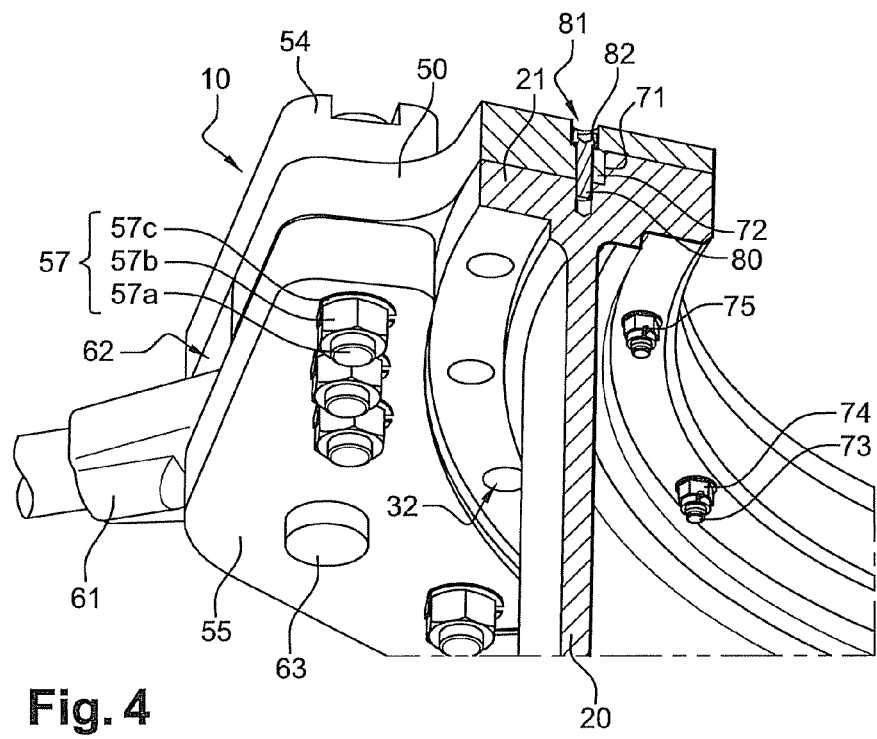
FIG. 4 illustrates a perspective view, in partial section, of the motor stand according to the invention.

As illustrated in FIG. 4, representing in perspective and according to a partial section the motor stand 20 according to the invention, the centering of the annular element 50 on the support flange 21 is ensured by fitting. The fitting is carried out advantageously by arranging a cylindrical tenon 71 on the support face of the support flange 21 and a corresponding mortise 72 on the lower face of the annular element 50.

According to another embodiment of the invention, the centering of the annular element 50 on the support flange 21 can be obtained by the arrangement of a mortise on the support flange 21 and on the annular element 50 and by using an added tenon, the thickness of which permits a fitting in the mortises of the support flange 21 and of the annular element 50.

The mortise/tenon connection is dimensioned to permit the taking up of the stresses exerted by the transverse holding means 60 in accidental situations.

Assuming an alignment fault of the transverse holding means 60, the stresses exerted by the holding means 60 are not applied to the motor stand 20 following radial directions, but along different directions. Thus, their resultants will present a predominant radial component, but also a tangential component.

The radial component is taken up by the tenon/mortise connection previously described. The tangential component results at the level of the tenon/mortise connection in a moment about a vertical axis parallel to the longitudinal axis of the motor stand 20.

Figure 5:
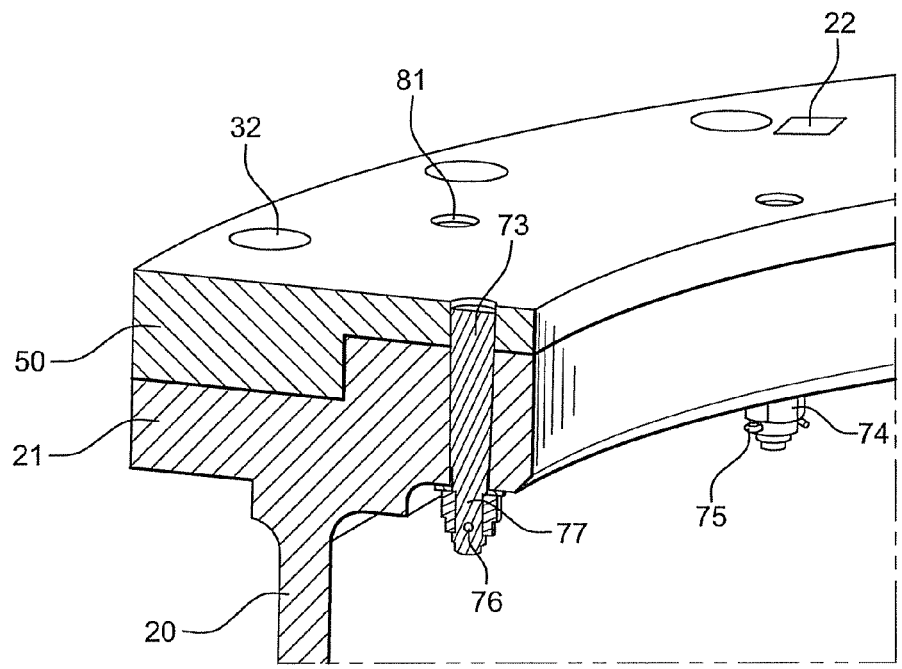
FIG. 5 illustrates a detailed view in perspective and according to a second partial section of the motor stand according to the invention.

According to the advantageous embodiment illustrated in FIG. 5, the taking up of this moment is ensured by the insertion of conical pins 73 passing through the annular element 50 and the support flange 21, the conical pins being distributed circumferentially on the support surface 24.

According to a second embodiment of the invention, the conical pins can be replaced equally by cylindrical pins, elastic pins or else other types of pins.

The taking up of this moment can likewise be realized by the use of teeth on each of the contact faces of the annular element 50 and the support flange 21, so as to create a tangential resistance to this stress.

According to a third embodiment of the invention, the taking up of the tangential stress can simply be realized by the flanging means 23 forming a cylindrical bolted joint and ensuring the connection between the motor 30 and the motor stand 20. In this case, the dimensioning of the screwing means 23 shall take into account the taking up of this tangential stress by adherence between the contact faces of the annular element 50 and the support flange 21.

The blocking of the conical pins 73 is carried out by means of nuts 74, advantageously of the castle-nut type, locked by means of a split pin 75 passing inside one of the crenels of the nut 74 and through an orifice 76 previously bored in the threaded part 77 of the conical pin 73.

According to another embodiment of the invention, the locking of the nut 74 can be carried out by caulking of the nut, or else by partial welding of the nut 74 on the threaded part 77 of the conical pin 73.

So as to facilitate the handling of the motor stand 20, and in particular for the mounting or the dismantling of the motor 30, the annular element 50 is advantageously integral with the support flange 21 by means of a plurality of screws 80 (FIG. 4). The screws 80 are advantageously screws with a hollow cylindrical hexagonal head, the heads of which are positioned in spot facings 81 arranged in the annular element 50, such that the screws 80 do not interfere with the motor flange 31 on mounting of the motor 30. The locking of these fixing screws 80 is advantageously carried out by lock washers 82 positioned under the head of the screws 80, of the Nord-lock™ type. However, it is also able to be envisaged to use screws having a hollow cylindrical hexagonal head comprising locking grooves associated with lock cups.

According to an advantageous embodiment of the invention, the motor stand according to the invention is realized by foundry work, however, it can also be realized from a mechanically welded assembly.

Owing to the invention, the design of a motor stand is simplified and allows the creation of a plurality of molding devices to be overcome. In fact, in so far as a certain revolution symmetry of the annular element exists, it is possible to easily modify the position of the annular element, and consequently of the radial excrescence, as a function of the location of the primary motor-driven pump unit and as a function of the location of the articulated supports. Thus, it is possible to meet all the location situations of the primary motor-driven pump unit with the use of three standard parts: the annular element, the upper angle and the lower angle.

The invention claimed is:

1. A motor stand for a primary motor-driven pump unit of a pressurized water nuclear reactor comprising:
    an upper flange, and
    a fixing means configured to fix a transverse holding means of said primary motor-driven pump unit, said primary motor-driven pump unit comprising an electric motor having a lower flange configured to engage with said upper flange of said motor stand,
    wherein said fixing means comprises:
        an annular element arranged between said upper flange of said motor stand and said lower flange of said motor, said annular element comprising at least one radial excrescence formed by an appendage having a top face and a bottom face, said appendage being formed by two adjacent projecting bosses and a recessed zone formed between said two adjacent projecting bosses, wherein said appendage is formed integrally with said annular element and shares a common plane with said annular element;
        an upper plate and a lower plate fastened to the appendage and covering both faces of said appendage, said upper plate and lower plate each comprising a central bore opening into the recessed zone therein through which an axis is configured to be mounted; and
        a space delimited by said recessed zone and bordered by the upper plate and the lower plate, said space being configured to receive and to link said transverse holding means to said fixing means via said axis.

2. The motor stand of a primary motor-driven pump unit of a pressurized water nuclear reactor according to claim 1, wherein said upper plate and said lower plate are each formed by an angle comprising two lateral branches and the central bore.

3. The motor stand of a primary motor-driven pump unit of a pressurized water nuclear reactor according to claim 2, wherein the fixing means comprises the axis passing through the central bore of said angles and configured to pass through said transverse holding means so as to fix the fixing means to said transverse holding means.

4. The motor stand of a primary motor-driven pump unit of a pressurized water nuclear reactor according to claim 2, wherein said angles comprise bores passing through said lateral branches configured to receive screwing means.

5. The motor stand of a primary motor-driven pump unit of a pressurized water nuclear reactor according to claim 4, wherein at least one of the two angles comprises means for blocking the rotation of said screwing means.

6. The motor stand of a primary motor-driven pump unit of a pressurized water nuclear reactor according to claim 5, wherein said means for blocking the rotation of said screwing means is formed by grooves located level with each of the lateral branches.

7. The motor stand of a primary motor-driven pump unit of a pressurized water nuclear reactor according to claim 4, wherein at least one of the two angles is manufactured with said annular element.

8. The motor stand of a primary motor-driven pump unit of a pressurized water nuclear reactor according to claim 1, wherein said annular element is rendered integral with said upper flange of said motor stand by screwing means.

9. The motor stand of a primary motor-driven pump unit of a pressurized water nuclear reactor according to claim 1, wherein said motor stand comprises a plurality of pins passing through said annular element and said upper flange and configured to block the rotation of said annular element.

10. The motor stand of a primary motor-driven pump unit of a pressurized water nuclear reactor according to claim 1, wherein said upper flange comprises a tenon and said annular element comprises a complementary mortise, said tenon and said complementary mortise being configured to withstand radial stresses transmitted by said transverse holding means.

11. A primary motor-driven pump unit of a pressurized water nuclear reactor, comprising:
- an electric motor having a lower flange;
- a motor stand comprising:
  - an upper flange configured to engage with said lower flange of said electric motor, and
  - a fixing means configured to fix a transverse holding means of said primary motor-driven pump unit, wherein said fixing means comprises:
    - an annular element arranged between said upper flange and said lower flange of said motor, said annular element comprising at least one radial excrescence formed by an appendage having a top face and a bottom face, said appendage being formed by two adjacent projecting bosses and a recessed zone formed between said two adjacent projecting bosses, wherein said appendage is formed integrally with said annular element and shares a common plane with said annular element;
    - an upper plate and a lower plate fastened to the appendage and covering both faces of said appendage, said upper plate and lower plate each comprising a central bore opening into the recessed zone therein through which an axis is configured to be mounted; and
    - a space delimited by said recessed zone and bordered by the upper plate and the lower plate, said space being configured to receive and to link said transverse holding means to said fixing means via said axis, and
- articulated supports supporting said primary motor-driven pump unit, wherein the position of the at least one radial excrescence of said motor stand is modifiable as a function of the location of said articulated supports by angular modification of the position of the fixing means between the upper flange and the lower flange of said motor.

* * * * *